United States Patent Office 3,119,861
Patented Jan. 28, 1964

3,119,861
PREPARATION OF BETA-HALO CARBOXYLIC ACID HALIDES
Angus U. Blackham, Provo, Utah, assignor to National Distillers and Chemical Corporation, New York, N.Y., a corporation of Virginia
No Drawing. Filed Oct. 24, 1960, Ser. No. 64,252
4 Claims. (Cl. 260—544)

The present invention relates to a novel method for preparation of beta-halo acyl halides and, more specifically, to the preparation of such halides by reaction of carbon monoxide with an olefinic hydrocarbon-palladium halide complex in the presence of a liquid reaction medium inert with respect to acyl halides. In specific embodiments, beta-chloropropionyl chloride is prepared from reaction of carbon monoxide with an ethylene-palladium chloride complex, beta-chlorobutyryl chloride from carbon monoxide and a propylene-palladium chloride complex, and the like.

In accordance with this invention, a compound of the formula $Pd(L)X_2$ or $[PdLX_2]_2$, the dimeric form, wherein X is a halogen atom and L is an olefinic hydrocarbon ligand, is reacted with carbon monoxide to produce a beta-halo acyl halide. Preferably, the invention is carried out with compounds of the aforesaid formula in which the halogen atom is chlorine although such compounds in which the halogen is bromine or other halogen atom may be used.

As to the L representing an olefinic hydrocarbon ligand, preferred embodiments are compounds of the aforesaid formula in which L is a lower molecular weight alkene, such an ethylene and propylene. However, although lower molecular weight alkenes such as those containing 2 or 3 carbon atoms comprise preferred embodiments for the L component of the aforesaid formula, L may be a higher carbon atom alkene or olefin, capable of forming a $\pi$-complex through the carbon-carbon double bond with the palladium compound, such as 1-butene, styrene, biallyl, etc. Specific compounds embodied herein and falling within the scope of the aforesaid formula include $[PdLCl_2]_2$ in which L has the aforesaid significance.

Preferably, the reaction of the present invention is carried out by preforming the aforesaid palladium halide complex prior to reaction with the carbon monoxide. However, if desired, the complex may be formed in situ while in contact with the carbon monoxide in which case palladium halide, an olefin, carbon monoxide and a liquid reaction medium inert to acyl halides comprise the reaction mixture. Although the present invention is directed to the aforesaid reaction of carbon monoxide with an olefin-palladium halide complex, irrespective of the manner of formation of the complex, other methods of preparing the complex, either by preforming or simultaneous with the carbon monoxide reaction, include the reaction between an olefin and a compound of the formula $PdL'_2X_2$ in which L' is an organic ligand other than an olefin and replaceable by an olefin. As an example thereof, a compound such as $Pd(C_6H_5CN)_2Cl_2$ can be reacted with, for example, ethylene, whereby the benzonitrile is replaced by ethylene to form $[Pd(C_2H_4)Cl_2]_2$ for reaction with carbon monoxide as embodied herein.

The reaction embodied herein may be carried out over a wide range of temperature. Thus, illustratively, the reaction can be carried out at room temperature, at which it proceeds very satisfactorily as well as at much higher temperatures, such as 80–110° C. or even higher. In the use of gaseous olefins for the reaction with the carbon monoxide, elevated pressure may be employed and, in some instances, is desired as rate of reaction is generally increased.

In reference to the reaction medium, it should be inert with respect to acyl halides under ordinary conditions and, especially, under the conditions which the reaction embodied herein is carried out. Thus, for purpose of illustration and not limitation, suitable compounds for use as the reaction medium include hydrocarbons such as benzene, alkylbenzenes such as toluene, halogenated compounds such as chloroform and chlorinated alkanes, nitroparaffins, and others.

In order to further describe the present invention, the following embodiments are set forth for purposes of illustration and not limitation.

Example I

In a glass liner of a Parr rocking autoclave, 10.7 grams (60 mm.) of $PdCl_2$ was suspended in 100 ml. of benzene. The autoclave was sealed and ethylene was added to a pressure of 380 p.s.i. The resulting mixture was shaken for 3 hours during which time the $PdCl_2$ was converted to $[Pd(C_2H_4)Cl_2]_2$. The ethylene was then vented and carbon monoxide was added to a pressure of 600 p.s.i. The mixture was shaken for 16 hours at room temperature (25° C.), the CO was vented and the system opened. The reaction mixture was filtered producing a residue and a clear filtrate. A portion of the filtrate was titrated with a solution of aniline in benzene to a point at which no further cloudiness appeared in the liquid, the cloudiness being due to the formation of insoluble aniline hydrochloride. The resulting aniline hydrochloride was filtered, and the benzene filtrate evaporated under vacuum. The impure residue was twice recrystallized from ethanol-water producing a product having a melting point of 116° C., i.e., the same value as for a known sample of the anilide of beta-chloropropionyl chloride. A mixture of these derivatives also had a melting point of 116° C.

Examples II and III

In the same manner as described in Example I, two other runs were carried out but with reactants and conditions set forth in the following tabulation which, for convenience, also sets forth the corresponding reactants and conditions for Example I.

| Example | I | II | III |
|---|---|---|---|
| Charge: | | | |
| Palladium Compound | 60 mm. $PdCl_2$ | 10 mm. $(Pd(C_2H_4)Cl_2)_2$ | 30 mm. $PdCl_2$. |
| Solvent | 100 ml. benzene | 25 ml. benzene | 50 ml. $CHCl_3$. |
| Ethylene | 380 p.s.i./3 hours | Complex preformed | 850 p.s.i./5 hours. |
| Carbon Monoxide | 600 p.s.i./16 hours | 10 mm. CO, slowly absorbed. | 600 p.s.i./16 hours. |
| Temperature | 25° C | 25° C | 25° C. |
| Reaction Mixture: | | | |
| Residue | Blue Black | Light Tan | Blue Gray. |
| Amount of $ClCH_2CH_2COCl$ | 22.4 mm | 3.3 mm | 6.5 mm. |
| Yield based on $PdCl_2$ | 37% | 33% | 21%. |

Example IV

In a glass liner of a Parr rocking autoclave 8.9 grams (50 mm.) of $PdCl_2$ was suspended in 100 ml. of benzene. Propylene was added to a pressure of 150 p.s.i. The mixture was shaken for six hours during which time the propylene-palladous chloride complex was formed. Carbon monoxide was added to a pressure of 490 p.s.i. and the mixture shaken in the sealed autoclave at room temperature for 17 hours. The CO and propylene was vented and the system opened. The reaction mixture was filtered giving a light brown residue and a clear filtrate. Both the anilide and the p-toluide derivatives were prepared by titration of portions of the clear filtrate with the appropriate amine dissolved in benzene. From the amount of p-toluidine used, a yield of 17.4 mm. beta-chlorobutyryl chloride was calculated, 35% based on the intial $PdCl_2$. The data on these derivatives is summarized in the following tabulation.

Anilide derivative: $C_{10}H_{12}ONCl$—
  Calculated: C, 60.8; H, 6.10. M.P.=87–88° C.
  Found: C, 60.95; H, 5.95.
p-Toluide derivative: $C_{11}H_{14}ONCl$—
  Calculated: C, 62.5; H, 6.78. M.P.=119–120° C.
  Found: C, 62.74; H, 6.90.

The aforesaid data confirms the structure of the reaction product as beta-chlorobutyryl chloride in view of the following literature values for melting points of the stated compounds:

| | M.P., ° C. |
|---|---|
| Beta-chlorobutyranilide | 89–90 |
| Beta-chloroisobutyranilide | 109–109.5 |
| Alpha-chloroisobutyranilide | 71–71.5 |
| Alpha-chlorobutyryl-p-toluide | 98 |
| Beta-chlorobutyryl-p-toluide | 115, 124 |
| Gamma-chlorobutyryl-p-toluide | 95 |

Example V

In a closed system fitted with a gas measuring buret, a reaction flask and a magnetic stirrer, 20 mm. of preformed ethylene-palladous chloride complex

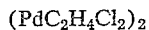

$(PdC_2H_4Cl_2)_2$ was suspended in 100 ml. of toluene and carbon monoxide added. The reaction mixture was distilled under vacuum using a rotary evaporator and a white solid material having a melting point of 38° C. was collected in a tube leading to a Dry Ice cold trap. By infrared analysis and melting point, this product was identified as beta-chloropropionic acid, resulting from reaction with atmospheric water of the beta-chloropropionyl chloride formed by the reaction of the complex with carbon monoxide.

Example VI

In this run, a gas stream of equal molar amounts of ethylene and CO was bubbled through $Pd(C_6H_5CN)_2Cl_2$ dissolved in toluene. The reaction mixture was held at 80° C. for five hours and then distilled under vacuum. Anhydrous ammonia was then passed into the distillate producing the amide of beta-chloropropionic acid (M.P. 96–98° C.; literature, 101° C.).

While particular embodiments of this invention are described above, it will be understood that the invention is obviously subject to variations and modifications without departing from its broader aspect.

What is claimed is:

1. A process for the preparation of beta-halocarboxylic acid halides which comprises reacting carbon monoxide with a complex from the group consisting of $Pd(L)X_2$ and $(PdLX_2)_2$, wherein X is selected from the group consisting of chlorine and bromine atoms and L is an olefinic hydrocarbon capable of forming a $\pi$-complex through the carbon-carbon double bond selected from the group consisting of alkenes, styrene and biallyl, in the presence of a liquid reaction medium inert to beta-halocarboxylic acid halides.

2. The process of claim 1 wherein said complex is formed in situ by reaction of an olefinic hydrocarbon capable of forming a $\pi$-complex through the carbon-carbon double bond selected from the group consisting of alkenes, styrene and biallyl, with a compound selected from the group consisting of $Pd(L')X_2$ and $(PdL'X_2)_2$, wherein X is selected from the group consisting of chlorine and bromine atoms and L' is benzonitrile.

3. A process for the preparation of beta-halocarboxylic acid halides which comprises reacting carbon monoxide with a palladous chloride complex of ethylene in the presence of a liquid reaction medium inert to beta-halocarboxylic acid halides.

4. A process for the preparation of beta-halocarboxylic acid halides which comprises reacting carbon monoxide with a palladous chloride complex of propylene in the presence of a liquid reaction medium inert to beta-halocarboxylic acid halides.

References Cited in the file of this patent
UNITED STATES PATENTS
2,565,461    Bliss et al. _____ Aug. 28, 1951

OTHER REFERENCES

Gelman et al.: "Chem. Abstracts," vol. 44, page 4363a (1950).

Dempsey et al.: J.A.C.S., volume 77, pages 4984–4987 (1955).